(12) United States Patent
Shen et al.

(10) Patent No.: US 11,858,446 B2
(45) Date of Patent: Jan. 2, 2024

(54) SEATBACK-MOUNTED AIRBAG

(71) Applicant: Ford Global Technologies, LLC, Dearborn, MI (US)

(72) Inventors: Ming Shen, Troy, MI (US); Huipeng Chen, Canton, MI (US); Agnes S. Kim, Dearborn, MI (US); Robert William McCoy, Ann Arbor, MI (US); James Chih Cheng, Troy, MI (US); Raed Essa EL-Jawahri, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 17/237,108

(22) Filed: Apr. 22, 2021

(65) Prior Publication Data
US 2022/0340095 A1     Oct. 27, 2022

(51) Int. Cl.
*B60R 21/207*     (2006.01)
*B60R 21/239*     (2006.01)
*B60R 21/2338*     (2011.01)

(52) U.S. Cl.
CPC .......... *B60R 21/207* (2013.01); *B60R 21/239* (2013.01); *B60R 21/2338* (2013.01)

(58) Field of Classification Search
CPC .. B60R 21/207; B60R 21/2338; B60R 21/239
See application file for complete search history.

(56) References Cited

U.S. PATENT DOCUMENTS

| | | | |
|---|---|---|---|
| 9,573,553 B2 | 2/2017 | Ko et al. | |
| 10,752,199 B2 | 8/2020 | Chen et al. | |
| 11,104,288 B2* | 8/2021 | Fuma | B60R 21/26 |
| 2019/0176739 A1* | 6/2019 | Song | B60R 21/207 |
| 2020/0122676 A1* | 4/2020 | Sekizuka | B60N 2/42745 |
| 2020/0353885 A1* | 11/2020 | Kim | B60R 21/01554 |
| 2020/0391691 A1 | 12/2020 | Fischer et al. | |
| 2021/0009074 A1* | 1/2021 | Wold | B60R 21/231 |
| 2021/0094499 A1* | 4/2021 | Deng | B60R 21/261 |

FOREIGN PATENT DOCUMENTS

WO     2019168883 A1     9/2019

* cited by examiner

*Primary Examiner* — Jason D Shanske
*Assistant Examiner* — Matthew James O'Neill
(74) *Attorney, Agent, or Firm* — Frank A. MacKenzie; Bejin Bieneman PLC

(57) ABSTRACT

An assembly for a vehicle includes a dash. The assembly includes a seat having a seatback and a head restraint extending upwardly from the seatback. The assembly includes an airbag supported by the seatback. The airbag is inflatable from the seatback toward the dash in a seat-rearward direction to an inflated position. The airbag includes an upper portion adjacent the head restraint and a pair of lobes extending from the upper portion along the head restraint in a seat-forward direction in the inflated position. The head restraint is between the lobes in the inflated position.

20 Claims, 6 Drawing Sheets

SEATBACK-MOUNTED AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
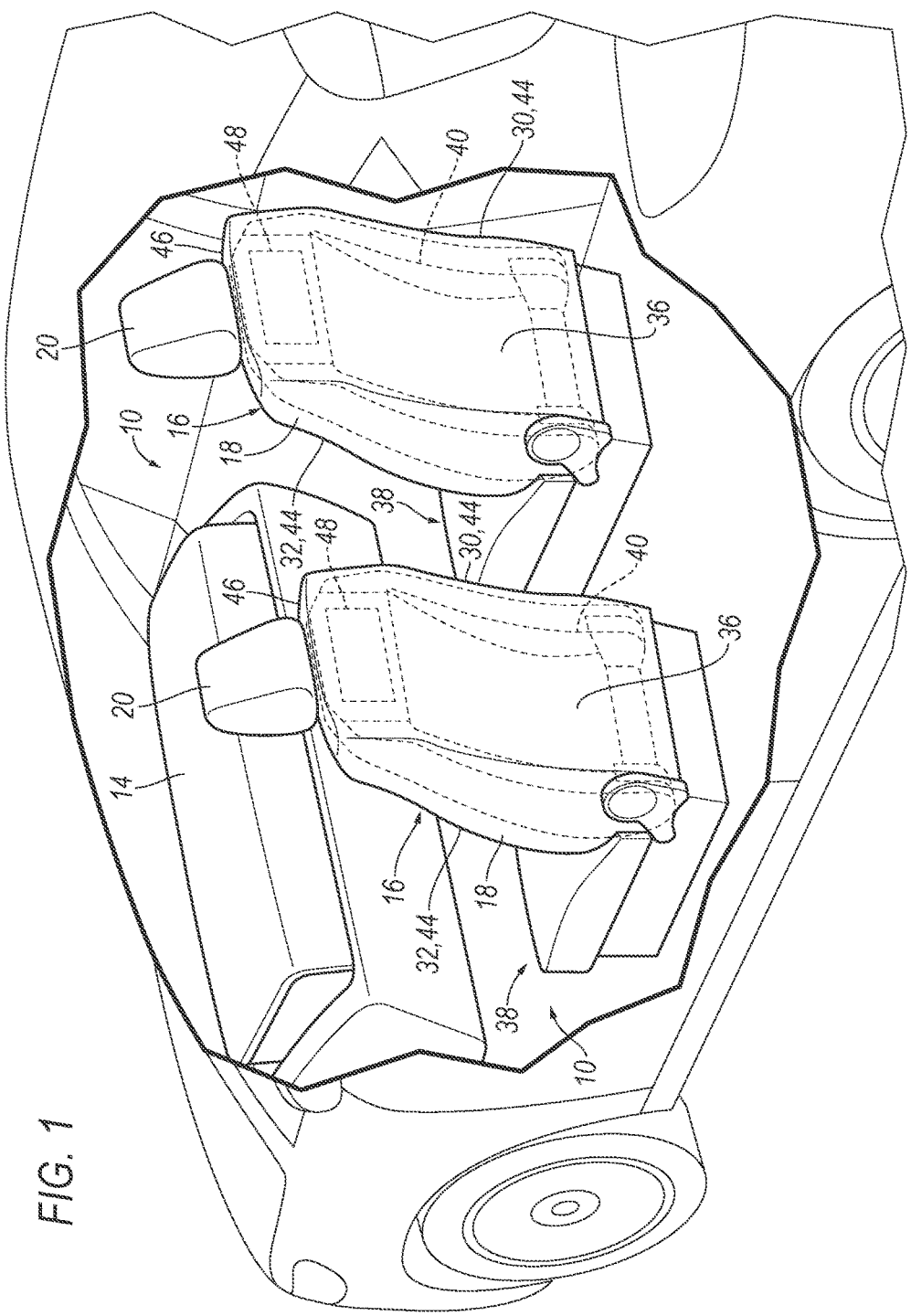
FIG. 1 is a perspective view of a vehicle including a seat in a forward-facing position having a seatback supporting an airbag in an uninflated position.

An assembly for a vehicle includes a dash. The assembly includes a seat having a seatback and a head restraint extending upwardly from the seatback. The assembly includes an airbag supported by the seatback. The airbag is inflatable from the seatback toward the dash in a seat-rearward direction to an inflated position. The airbag includes an upper portion adjacent the head restraint and pair of lobes extending from the upper portion along the head restraint in a seat-forward direction in the inflated position. The head restraint is between the lobes in the inflated position.

The airbag may include a lower portion below the upper portion, the lower portion having a first thickness from the seatback in the seat-rearward direction and the upper portion having a second thickness from the seatback in the seat-rearward direction, the second thickness being greater than the first thickness.

The lower portion may be connected to the seatback and the upper portion is supported on the lower portion.

The assembly may include an inflator in direct fluid communication with the lower portion, the upper portion being in fluid communication with the inflator through the lower portion.

The assembly may include a windshield extending upwardly from the dash, the upper portion of the airbag abutting the head restraint, the dash, and the windshield in the inflated position.

The upper portion may be wedged between the head restraint, the dash, and the windshield in the inflated position.

The assembly may include a windshield, the upper portion of the airbag including a top panel abutting the windshield and a bottom panel abutting the dash in the inflated position.

The top panel and the bottom panel may meet at a point of the airbag that is distal-most from the head restraint in the inflated position.

The airbag may include a vent in the top panel.

The lobes may be above the seatback in the inflated position.

The airbag may include a tether between the upper portion and the lower portion.

A seat includes a seatback, a head restraint extending upwardly from the seatback, and an airbag supported by the seatback and inflatable from the seatback in a seat-rearward direction to an inflated position, the airbag including an upper portion adjacent the head restraint and a pair of lobes extending from the upper portion along the head restraint in a seat-forward direction in the inflated position, the head restraint being between the lobes in the inflated position.

The seat may include an inflator in direct fluid communication with the lower portion, the upper portion being in fluid communication with the inflator through the lower portion.

The upper portion may include a top panel and a bottom panel that meet at a point of the airbag that is distal-most from the head restraint in the inflated position.

With reference to the Figures, wherein like numerals indicate like parts throughout the several views, an assembly 10 for a vehicle 12 includes a dash 14. The assembly 10 includes a seat 16 having a seatback 18 and a head restraint 20 extending upwardly from the seatback 18. The assembly 10 includes an airbag 22 supported by the seatback 18. The airbag 22 is inflatable from the seatback 18 toward the dash 14 in a seat-rearward direction to an inflated position. The airbag 22 includes an upper portion 24 adjacent the head restraint 20 and a pair of lobes 26 extending from the upper portion 24 along the head restraint 20 in a seat-forward direction in the inflated position. The head restraint 20 is between the lobes 26 in the inflated position.

In the event of an impact to the vehicle 12, the airbag 22 may move to the inflated position. In the event the seat 16 is in an away-facing direction relative to the dash 14, as described further below, the airbag 22 inflates from the seatback 18 and toward the dash 14. The upper portion 24 supports the seatback 18 and the head restraint 20 against the dash 14 to resist movement of the seatback 18 toward the dash 14. The lobes 26 extending along the head restraint 20 with the head restraint 20 being between the lobes 26 allows the lobes 26 to control the kinematics of a head of an occupant seated in the seat 16 in the event of an impact to the vehicle 12, for example, an oblique impact, that may urge the head of the occupant to move in a cross-seat direction. Accordingly, the airbag 22 can control occupant kinematics during multiple vehicle collision types. Since the airbag 22 is inflatable from the seatback 18, the airbag 22 controls the kinematics of an occupant of the seat 16 in any facing direction in examples in which the seat 16 is rotatable, as described further below.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor, vehicle roof, etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12. The floor is spaced from the roof and the pillars extending downwardly from the roof towards the floor. The roof and the floor may each extend across the passenger cabin, i.e., from one side to the other side of the vehicle 12. The roof may define an upper boundary of the passenger cabin and the floor may define a lower boundary of the passenger cabin.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

Figure 2:
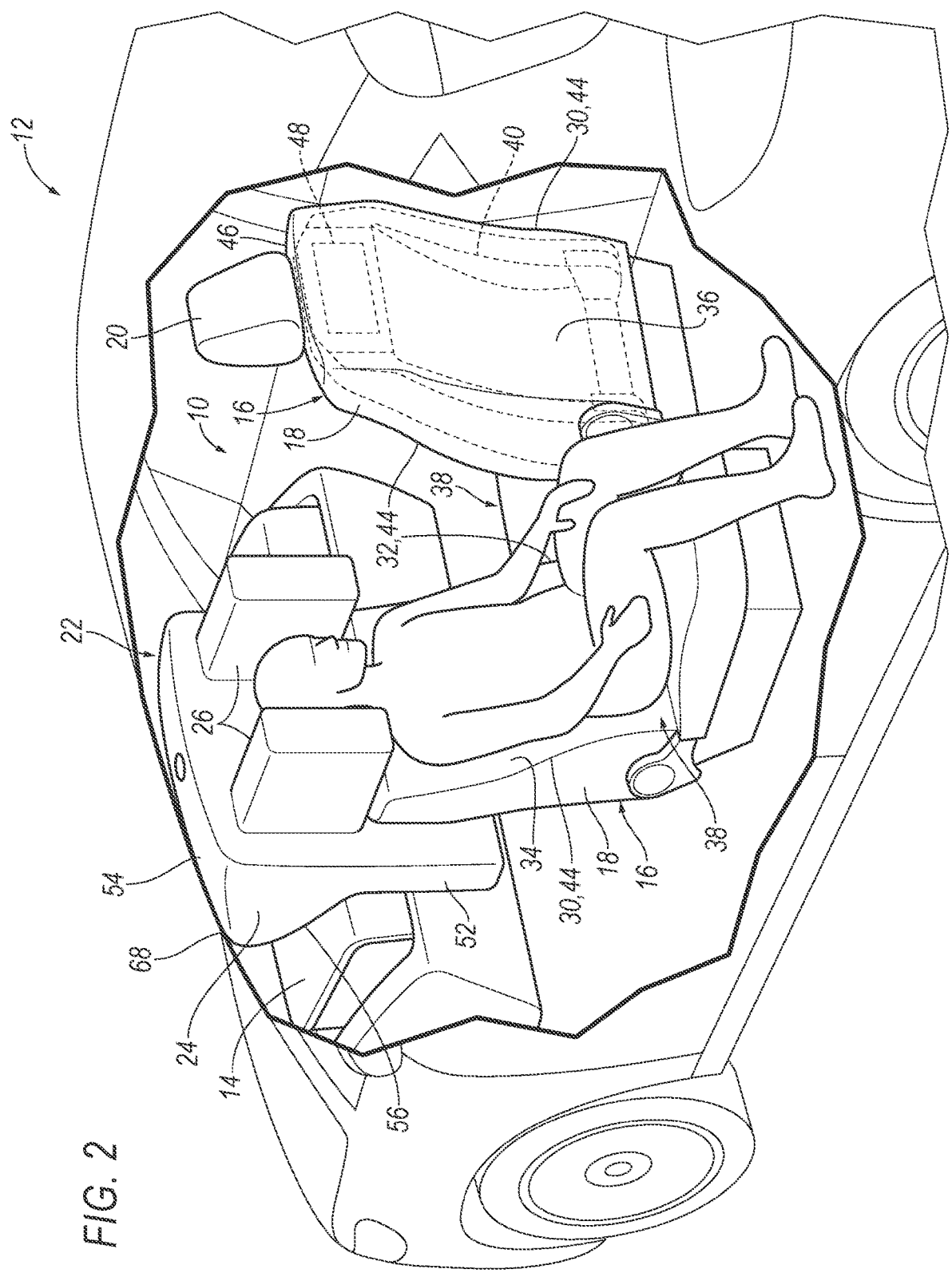
FIG. 2 is a perspective view of the vehicle including a seat in an away-facing position having the seatback supporting the airbag in an inflated position.
Figure 3:
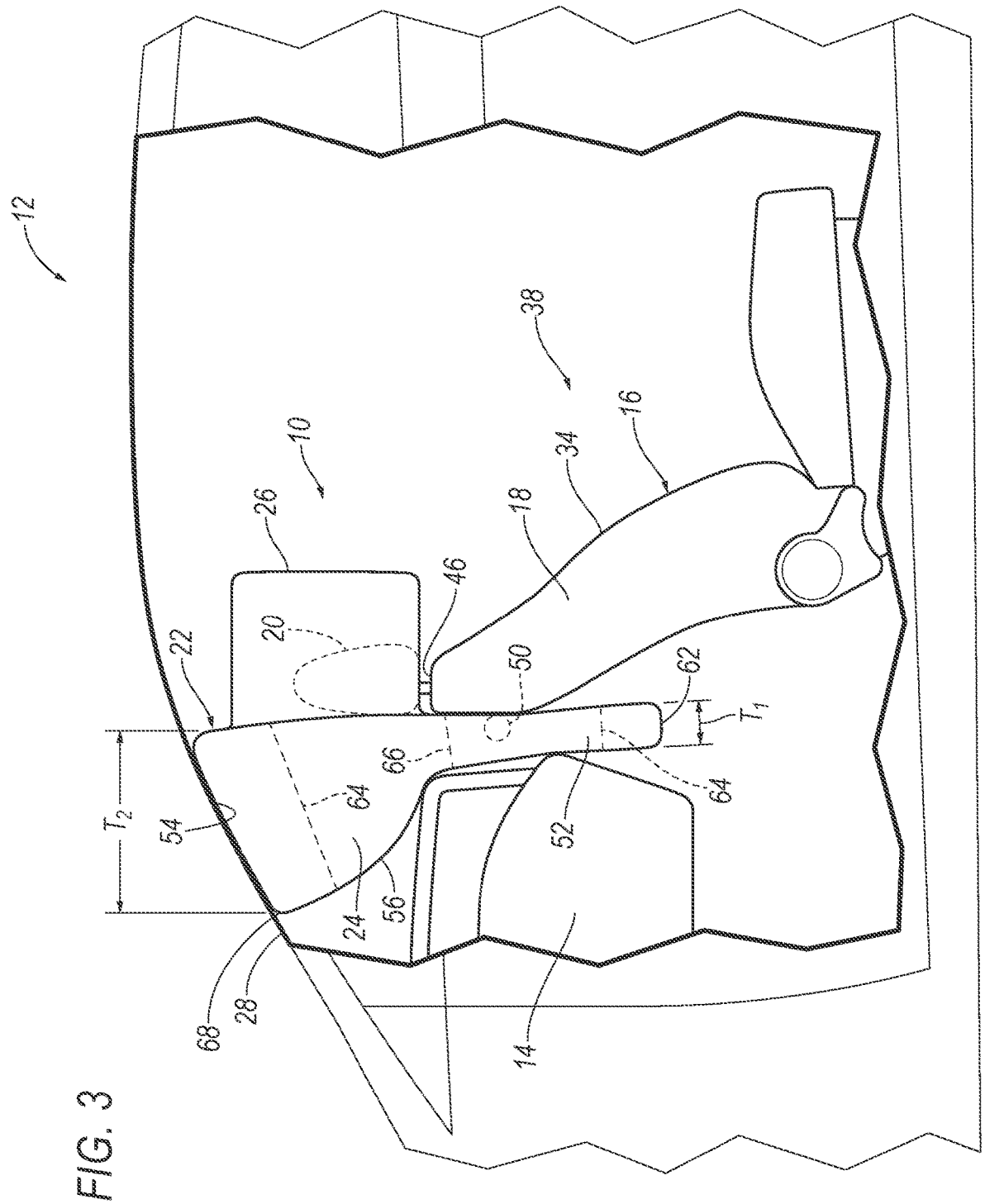
FIG. 3 is a side view of the vehicle showing the seat in the away-facing position and the airbag in the inflated position.

With reference to FIGS. 1-3, the vehicle 12 includes at least one dash 14. In the example shown in the Figures, the dash 14 is at the front end of the passenger compartment. As another example, the dash 14 may be at the rear of the vehicle 12. In some examples, the vehicle 12 may include two dashes 14, specifically one dash 14 at the front of the vehicle 12 and one dash 14 at the rear of the vehicle 12. The dash 14 may also be called a bulkhead or an instrument panel.

The dash 14 may include vehicle controls, such as gauges, dials, screens, and information displays; heating and ventilation equipment; a radio and other electronics; etc. The dash 14 may, for example, include a class-A surface, i.e., a surface specifically manufactured to have a high quality, finished aesthetic appearance free from blemishes. The dash 14, as well as the rest of the vehicle 12, may lack a steering wheel and may lack pedals for accelerating and braking. In other words, as shown in the Figures, no steering wheel or pedals for accelerating and braking are supported by or adjacent to the dash 14. More specifically, the vehicle 12 does not include a steering wheel or pedals for accelerating and braking, e.g., the vehicle 12 is autonomous. The dash 14 may, for example, be flat in the cross-vehicle direction, as shown in FIGS. 1-3. In other words, the dash 14 may be generally planar.

The dash 14 may extend from one side of the vehicle 12 to the other side of the vehicle 12, i.e., across the passenger compartment in a cross-vehicle direction. For example, the dash 14 may extend from one body pillar to another body pillar. The dash 14 may extend downwardly from a windshield 28. For example, the dash 14 may extend from the windshield 28 to the vehicle floor of the vehicle 12.

The dash 14 may be a structural member of a frame (not numbered) of the vehicle 12, i.e., a portion of the frame resists static and dynamic forces from operation of the vehicle 12 without undue deflection or distortion. Examples of forces include a weight of other vehicle components, passengers, and cargo; twisting forces caused by driving over uneven surfaces; torque from a transmission; longitudinal and lateral forces from driving; and possibly forces from impacts with other vehicles or impactors.

The vehicle 12 may include the windshield 28 disposed at the front end of the passenger compartment and extending upwardly from the dash 14. The windshield 28 may extend from one side of the vehicle 12 to the other side of the vehicle 12. The windshield 28 may extend from the roof to the dash 14. The windshield 28 may face in a forward direction from the passenger compartment. The windshield 28 may be any suitably transparent material, including glass such as laminated, tempered glass or plastic.

Figure 5:
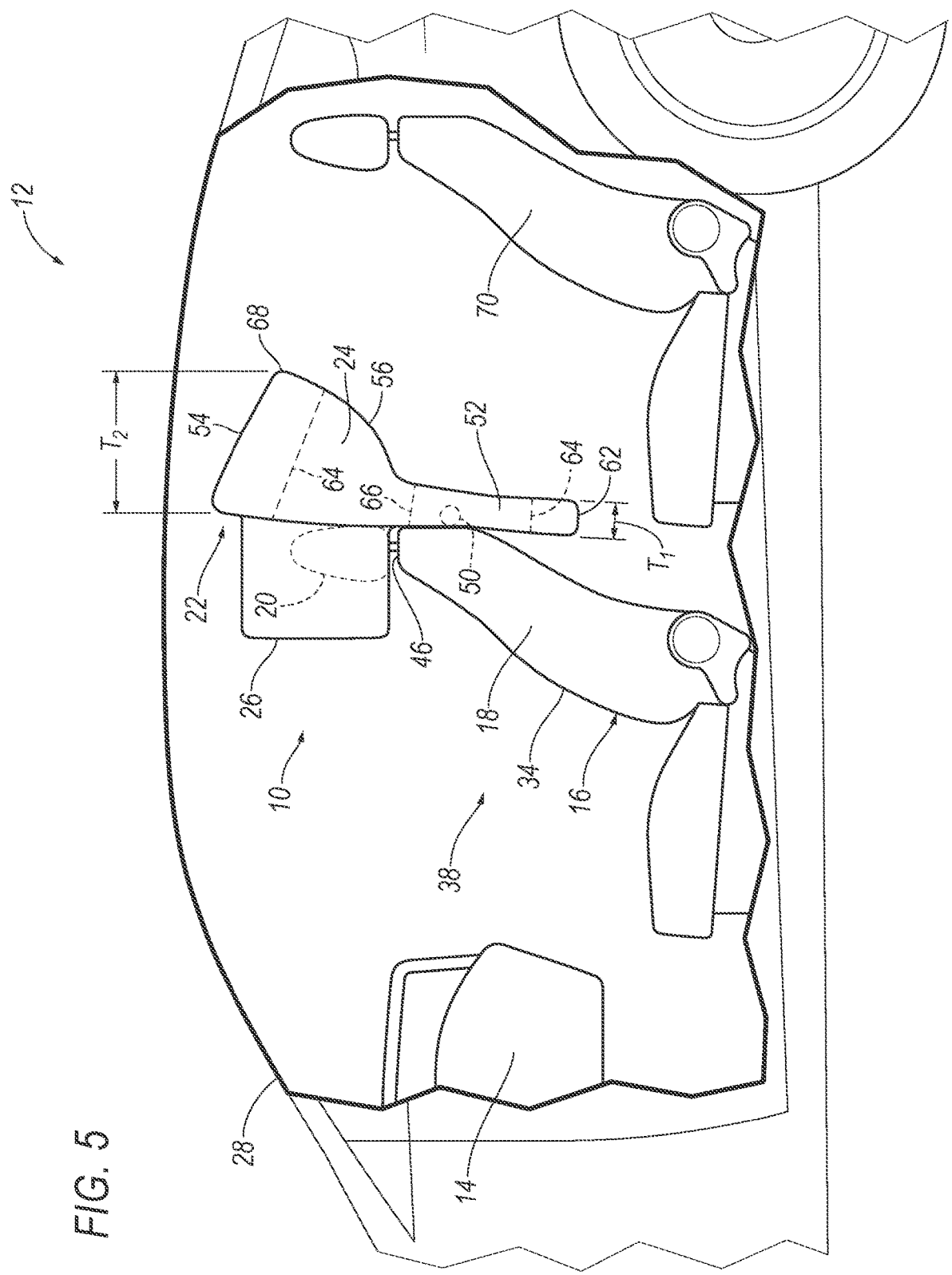
FIG. 5 is a side view of the vehicle showing the seat in the forward-facing position and a second seat spaced along a vehicle-longitudinal axis from the seat.

With reference to FIGS. 1-3, the vehicle 12 may include one or more seats 16. Specifically, the vehicle 12 may include any suitable number of seats 16. As shown in FIG. 1, the seats 16 are supported by the vehicle floor (not numbered). The seats 16 may be arranged in any suitable arrangement in the passenger compartment. As in the example shown in the Figures, one or more of the seats 16 may be at the front end of the passenger compartment, e.g., a driver seat and/or a passenger seat. In other examples, such as shown in FIG. 5, one or more of the seats 16 may be behind the front end of the passenger compartment, e.g., at the rear end of the passenger compartment. The seats 16 may be movable relative to the vehicle floor to various positions, e.g., movable fore-and-aft and/or cross-vehicle 12. The seats 16 may be of any suitable type, e.g., a bucket seat.

The seats 16 include the seatback 18, a seat bottom (not numbered), and the head restraint 20. The head restraint 20 may be supported by and extending upwardly from the seatback 18. The head restraint 20 may be stationary or movable relative to the seatback 18. The seatback 18 may be supported by the seat bottom and may be stationary or movable relative to the seat bottom. The seatback 18, the seat bottom, and the head restraint 20 may be adjustable in multiple degrees of freedom. Specifically, the seatback 18, the seat bottom, and the head restraint 20 may themselves be adjustable. In other words, adjustable components within the seatback 18, the seat bottom, and the head restraint 20 may be adjustable relative to each other.

The seatback 18 includes a first side 30, a second side 32, a front side 34 extending between the first side 30 and the second side 32, and a rear side 36 extending between the first side 30 to the second side 32. When the seat 16 is in the rearward-facing position, the rear side 36 of the seatback 18 faces vehicle-forward and the front side 34 of the seatback 18 faces vehicle-rearward.

The seatback 18 defines an occupant seating area 38 of the seat 16. Specifically, the seatback 18 defines the occupant seating area 38 between the first side 30 and the second side 32. The front side 34 of the seatback 18 between the first side 30 and the second side 32 defines the occupant seating area 38. The occupant seating area 38 is the area occupied by an occupant when seated on the seat bottom. The occupant seating area 38 is in the seat-forward direction of the seatback 18 and above the seat bottom.

With continued reference to FIGS. 1-3, the seat 16 includes a frame 40 and a covering (not numbered). Specifically, as shown in the figures, the seatback 18 includes the frame 40 and the covering supported on the frame 40. The frame 40 may include tubes, beams, etc. Specifically, the frame 40 includes a pair of upright frame members. The upright frame members are elongated, and specifically, are elongated in a generally upright direction when the seatback 18 is in a generally upright position. The upright frame members are spaced from each other and the frame 40 includes one or move cross-members extending between the upright frame members. The frame 40, including the upright frame members, may be of any suitable plastic material, e.g., carbon fiber reinforced plastic (CFRP), glass fiber-reinforced semi-finished thermoplastic composite (organosheet), etc. As another example, some or all components of the frame 40 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the frame 40. The padding may be between the covering and the frame 40 and may be foam or any other suitable material.

The seatback 18 may have bolsters 44 on opposite sides of the occupant seating area 38. The bolsters 44 are elongated, and specifically, are elongated in a generally upright direction when the seatback 18 is in a generally upright position. The bolsters 44 define cross-seat boundaries of the seatback 18, i.e., the seatback 18 terminates at the bolsters 44. The bolsters 44 may extend in a seat-forward direction relative to the occupant seating area 38, i.e., on opposite sides of the torso and shoulders of an occupant seated on the seat 16. The extension of the bolsters 44 relative to the occupant seating area 38 may be defined by the frame 40 or the covering.

The seatback 18 has a top 46 between the first side 30 and the second side 32. Specifically, the top 46 may extend between the bolsters 44. In other words, as shown in the Figures, the top 46 may terminate at the bolsters 44. The head restraint 20 may be supported on the top 46 of the seatback 18.

With reference to FIGS. 2 and 3, each seat 16 may rotate about an axis (not numbered) that extends through the vehicle roof and the vehicle floor. For example, the seats 16 may rotate between a forward-facing position and a rearward-facing position relative to the vehicle 12. In the forward-facing position, an occupant of the seat 16 faces the front end of the passenger compartment. In the rearward-facing position, an occupant of the seat 16 faces the rear end of the passenger compartment. The seats 16 may rotate completely, i.e., 360°, about the axis. The seats 16 may rotate between fixed positions, e.g., the forward-facing position and the rearward-facing position, or may be rotatable to an infinite number of positions.

The seat 16 may rotate to positions relative to other vehicle components. As an example, the seat 16 may rotate to a position relative to the dash 14. As an example, shown in the Figures, the seat 16 may rotate to an away-facing position. Specifically, in the away-facing position the rear side 36 of the seatback 18 is between the dash 14 and the occupant seating area 38, as described below. In this example, the seat 16 is in the rearward-facing position and in the away-facing position. In other words, the seat 16 is in the rearward-facing position relative to the vehicle 12 and the away-facing position relative to the dash 14. In another example, as shown in FIG. 5, the seat 16 may be a rear seat 70 and the vehicle 12 includes the dash 14 at the rear end of the passenger cabin. In this example, the seat 16 is in the forward-facing position and the away-facing position. In other words, the seat 16 is in the forward-facing position relative to the vehicle 12 and the away-facing position relative to the dash 14.

With reference to FIGS. 1-4B, the assembly 10 includes an airbag assembly 48. Specifically, the seat 16 includes the airbag assembly 48. The airbag assembly 48 includes the airbag 22, an inflator 50, and may include a housing (not shown). The vehicle 12 may include any suitable number of airbag assemblies. One or more of the seats 16 in the vehicle 12 may include the airbag assembly 48. As one example, each of the seats 16 of the vehicle 12 may include one airbag assembly 48. In examples including more than one airbag assembly 48, the airbag assemblies may be identical or substantially identical to each other.

The airbag assembly 48 is supported by the seatback 18. Specifically, the airbag assembly 48 is supported by the frame 40 of the seat 16 on the seatback 18. In an example in which the airbag assembly 48 includes the housing, the housing may be fixed directly the frame 40 of the seat 16, e.g., the frame 40 of the seatback 18. The airbag assembly 48 may be concealed by the covering 42, e.g., the upholstery of the seat 16. In other words, the airbag assembly 48 may be between the frame 40 of the seat 16 and the upholstery of the seat 16.

With reference to FIGS. 2 and 3, when the seat 16 is in the away-facing position, the airbag 22 is inflatable from the seatback 18 toward the dash 14. Specifically, the airbag 22 is inflatable from the seatback 18 in a seat-rearward direction to the inflated position between the seatback 18 and the dash 14. In other words, the airbag 22 inflates behind the seatback 18. When the airbag 22 is in the inflated position and the seat 16 is in the away-facing position, the airbag 22 is inflatable between the seat 16 and the dash 14. In the event of an impact to the vehicle 12 and when the seat 16 is in the away-facing position, the airbag 22 may move from an uninflated position to the inflated position to support the seatback 18 against the dash 14.

With reference to FIG. 5, when the seat 16 is in the forward-facing position, the airbag 22 may be inflatable from the seatback 18 toward the rear seat 70. Specifically, the airbag 22 is inflatable from the seatback 18 in a vehicle-rearward direction, i.e., the seat-rearward direction, to the inflated position between the seat 16 and the rear seat 70. Like in the away-facing position, the airbag 22 inflates behind the seatback 18 of the seat 16. When the airbag 22 is in the inflated position and the seat 16 is in the forward-facing position, the airbag 22 is inflatable between the seat 16 and the rear seat 70. In the event of an impact to the vehicle 12 and when the seat 16 is in the forward-facing position, the airbag 22 may move from the uninflated position to the inflated position to control kinematics of an occupant properly seated in the rear seat 70.

The inflator 50 is fluidly connected to the airbag 22 of the airbag assembly 48. The inflator 50 expands the airbag 22 with inflation medium, such as a gas, to inflate the airbag 22 from the uninflated position to the inflated position. The inflator 50 may be, for example, a pyrotechnic inflator 50 that ignites a chemical reaction to generate the inflation medium, a stored gas inflator 50 that releases (e.g., by a pyrotechnic valve) stored gas as the inflation medium, or a hybrid.

Figure 4A:
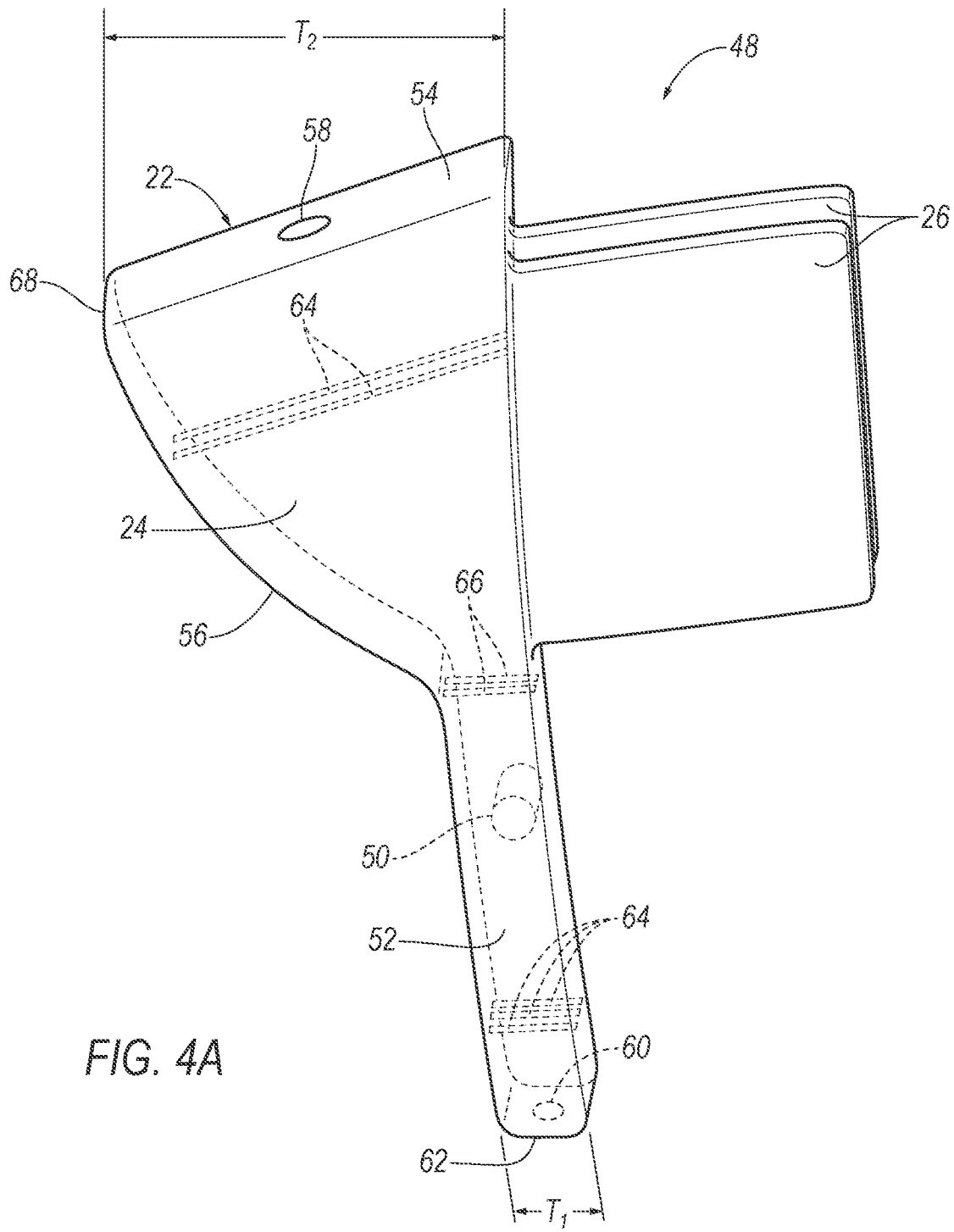
FIG. 4A is a side view of the airbag in the inflated position.
Figure 4B:
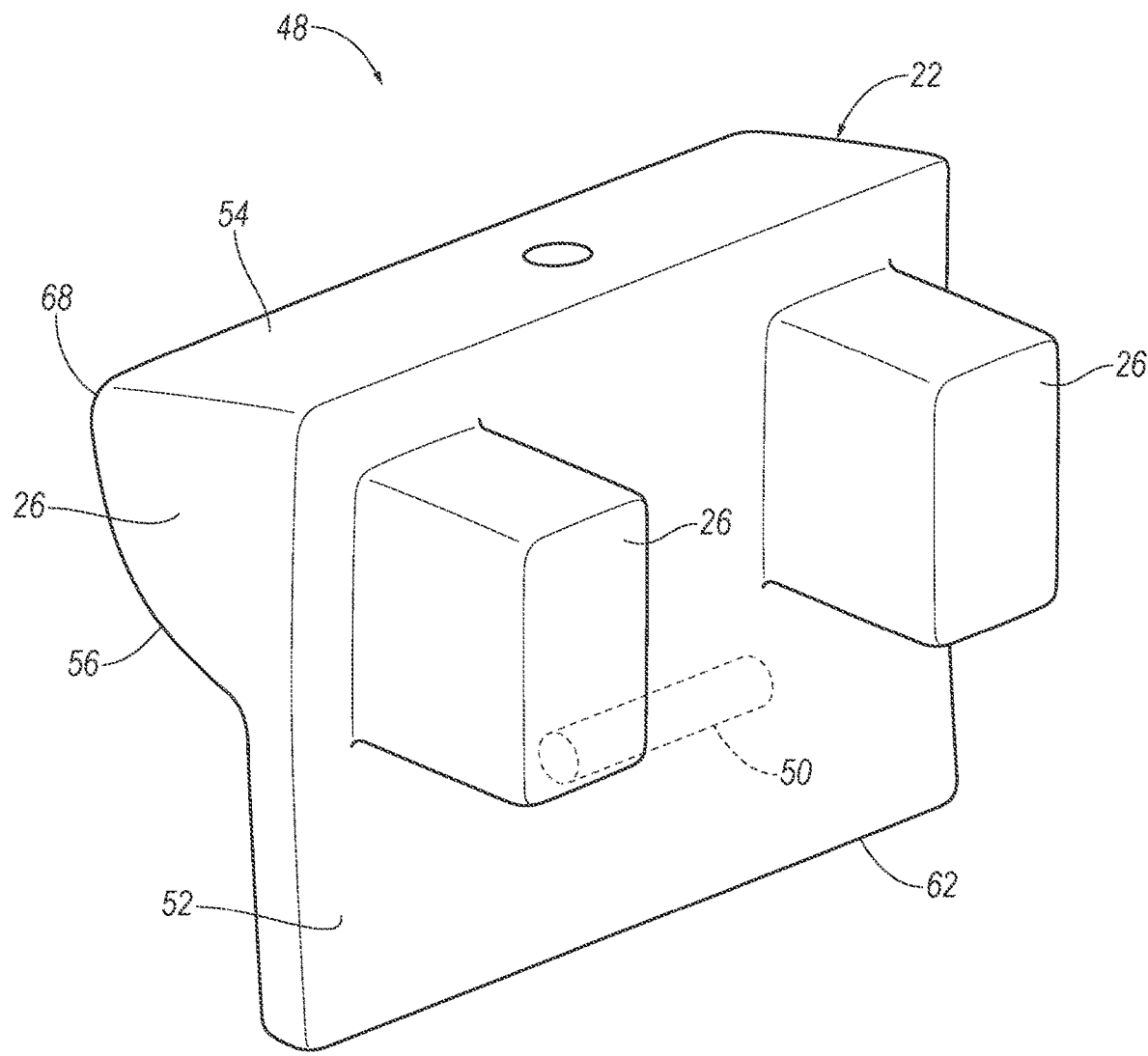
FIG. 4B is a perspective view of the airbag in the inflated position.

With reference to FIGS. 3-4B, the airbag 22 includes the upper portion 24 and a lower portion 52 below the upper portion 24 in the inflated position. The lower portion 52 is connected to the seatback 18. Specifically, the lower portion 52 is supported by the seatback 18 in the inflated position. The upper portion 24 is supported on the lower portion 52 above the lower portion 52. Specifically, the upper portion 24 may not connect directly to the seatback 18 and instead may be connected to the seatback 18 through the lower portion 52, i.e., the upper portion 24 is connected to the lower portion 52. The upper portion 24 of the airbag 22 extends upwardly from the lower portion 52 of the airbag 22. The lower portion 52 inflates in the seat-rearward direction from the seatback 18 and toward the dash 14 when the seat 16 is in the away-facing position. The lower portion 52 may be between the dash 14 and the seatback 18 in the inflated position. Specifically, in the inflated position, the lower portion 52 may abut the dash 14 and the seatback 18.

The upper portion 24 of the airbag 22 may be adjacent the head restraint 20 in the inflated position. The upper portion 24 extends in the seat-rearward direction from the head restraint 20 in the inflated position. The upper portion 24 extends from the head restraint 20 toward the dash 14 and the windshield 28 of the vehicle 12 in the inflated position.

The upper portion 24 is wedged between the head restraint 20, the dash 14, and the windshield 28 in the inflated position to support the head restraint 20 against the dash 14 and windshield 28 when the airbag 22 in the inflated position. In other words, the upper portion 24 may abut the head restraint 20, the dash 14, and the windshield 28 in the inflated position, i.e., the upper portion 24 contacts the head restraint 20, the dash 14, and the windshield 28 in the inflated position. The upper portion 24 uses the dash 14 and the windshield 28 as a reaction surface in the event of an impact to the vehicle 12. The upper portion 24 supports the head restraint 20 against the dash 14 and the windshield 28 in the event of an impact to the vehicle 12.

With reference to FIG. 3, the upper portion 24 includes a top panel 54 abutting the windshield 28 in the inflated position and a bottom panel 56 abutting the dash 14 in the inflated position. The top panel 54 extends from the head restraint 20 in the seat-rearward direction toward the windshield 28 of the vehicle 12, i.e., the top panel 54 defines an upper boundary of the upper portion 24 of the airbag 22. The bottom panel 56 may be spaced from the seatback 18 and extend upwardly from the lower portion 52. Specifically, the bottom panel 56 may extend angularly upwardly from the lower portion 52 toward the windshield 28. The top panel 54 and the bottom panel 56 meet at a point 68 of the airbag 22 that is distal-most from the head restraint 20 in the inflated position. In other words, the point 68 where the top panel 54 and bottom panel 56 meet is spaced from the head restraint 20 in the seat-rearward direction. Specifically, the point 68 is spaced farthest from the head restraint 20 than any other point 68 on the upper portion 24. The point 68 may be adjacent the windshield 28 in the inflated position.

With reference to FIGS. 2-4B, the lower portion 52 has a first thickness $T_1$ from the seatback 18 in the seat-rearward direction when the airbag 22 is in the inflated position. Specifically, the lower portion 52 extends from the seatback 18 in the seat-rearward direction by the first thickness $T_1$. The upper portion 24 has a second thickness $T_2$ from the seatback 18 in the seat-rearward direction when the airbag 22 is in the inflated position. Specifically, the upper portion 24 extends from the seatback 18 in the seat-rearward direction by the second distance. The second thickness $T_2$ may be greater than the first thickness $T_1$. In other words, in the inflated position, the upper portion 24 of the airbag 22 extends farther from the seatback 18 than the lower portion 52 of the airbag 22.

The airbag 22 may include a vent 58 in the top panel 54 of the upper portion 24. The airbag 22 may include a vent 60 spaced downwardly from the inflator 50 in a lower panel 62 of the lower portion 52. The vents 58, 60 may allow inflation medium from the inflator 50 to escape from the airbag 22 into the passenger compartment to control the stiffness of the airbag 22 in the inflated position. After the airbag 22 reaches the inflated position, the vents 58, 60 allow inflation medium to escape from the airbag 22 to allow the airbag 22 to deflate after completion of an impact to the vehicle 12. The airbag 22 may include any suitable number of vents 58, 60 in the upper portion 24 and the lower portion 52 at any suitable number of locations in the upper portion 24 and the lower portion 52.

With continued reference to FIGS. 3-4B, in the inflated position, the airbag 22 includes a pair of lobes 26 extending from the upper portion 24 of the airbag 22 above the seatback 18. The lobes 26 may be spaced upwardly from the lower portion 52 such that the lobes 26 are above the seatback 18 in the inflated position. As the airbag 22 moves to the inflated position, the lobes 26 extend in the seat-forward direction, i.e., opposite of the upper portion 24 and the lower portion 52 in the inflated position. Specifically, the lobes 26 extend along the head restraint 20 in the seat-forward direction in the inflated position, i.e., the lobes 26 extend along a seat-longitudinal axis toward the occupant seating area 38 of the seat 16.

The lobes 26 are spaced from each other in a cross-seat direction, i.e., a direction perpendicular to the seat-forward direction and the seat-rearward direction. In other words, the lobes 26 are spaced from each other along the seatback 18. In the inflated position, the head restraint 20 is between the lobes 26. In other words, the head of the occupant in the seat 16 may is between the lobes 26 when the airbag 22 is in the inflated position. In the event of the impact to the vehicle 12, specifically an oblique impact to the vehicle 12, the head of the occupant may be urged angularly in the seat 16. The lobes 26 control the kinematics of the head of the occupant between the lobes 26 in the event of the impact to limit and control the angular movement of the head of the occupant.

The inflator 50 is in direct fluid communication with the lower portion 52. In other words, the inflator 50 inflates the lower portion 52 without the inflation medium passing through any other portion of the airbag 22. Inflation medium flows from the inflator 50 and into the lower portion 52 of the airbag 22. The inflator 50 is in indirect fluid communication with the upper portion 24 and the lobes 26. In other words, the upper portion 24 and the pair of lobes 26 are in fluid communication with the inflator 50 through the lower portion 52. In other words, inflation medium passes from the inflator 50, through the lower portion 52, through the upper portion 24, and into the lobes 26. Specifically, the pair of lobes 26, the upper portion 24, and the lower portion 52 are in fluid communication with each other, i.e., inflation medium from the inflator 50 may pass freely from the lower portion 52 to the upper portion 24 and to the lobes 26.

With reference to FIGS. 3 and 4A, the airbag 22 includes a plurality of tethers 64 interior to the upper portion 24 and the lower portion 52. The tethers 64 maintain the shape of the upper portion 24 and the lower portion 52 when the airbag 22 is in the inflated position. In the example shown in the Figures, the upper portion 24 includes a pair of tethers 64 extending away from the head restraint 20 in the seat-rearward direction. In such an example, the pair of tethers 64 extend away from the head restraint 20 to the bottom panel 56 of the upper portion 24. The lower portion 52 includes three tethers 64 extending from the seatback 18 in the seat-rearward direction. The airbag 22 may include any suitable number of tethers 64 to maintain the shape of the upper portion 24 and the lower portion 52 when the airbag 22 is in the inflated position.

The airbag 22 includes a plurality of tethers 66 interior to the airbag 22 between the upper portion 24 and the lower portion 52. The tethers 66 may be at the location where the upper portion 24 and the lower portion 52 join together when the airbag 22 is in the inflated position. The tethers 66 extend away from the seatback 18 in the seat-rearward direction inside the airbag 22. In the example shown in the Figures, the airbag 22 includes a pair of tethers 66 between the upper portion 24 and the lower portion 52. The airbag 22 may include any suitable number of tethers 66 between the upper portion 24 and the lower portion 52 when the airbag 22 is in the inflated position.

The airbag 22, i.e., the upper portion 24, the lower portion 52, and the lobes 26, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a dash;
a seat having a seatback and a head restraint extending upwardly from the seatback; and
an airbag supported by the seatback and inflatable from the seatback toward the dash in a seat-rearward direction to an inflated position;
the airbag in the inflated position having a lower portion supported by the seatback and an upper portion supported by the lower portion, the upper portion extending from the lower portion upwardly to behind the head restraint; and
the airbag including a pair of lobes connected to the upper portion seat-rearward of the head restraint in the inflated position, the lobes extending from the upper portion along the head restraint in a seat-forward direction in the inflated position, the head restraint being between the lobes in the inflated position.

2. The assembly of claim 1, wherein the lower portion has a first thickness from the seatback in the seat-rearward direction and the upper portion has a second thickness from the seatback in the seat-rearward direction, the second thickness being greater than the first thickness.

3. The assembly of claim 2, further comprising an inflator in direct fluid communication with the lower portion, the upper portion being in fluid communication with the inflator through the lower portion.

4. The assembly of claim 2, further comprising a windshield extending upwardly from the dash, the upper portion of the airbag abutting the head restraint, the dash, and the windshield in the inflated position.

5. The assembly of claim 4, wherein the upper portion is wedged between the head restraint, the dash, and the windshield in the inflated position.

6. The assembly of claim 2, further comprising a windshield, the upper portion of the airbag including a top panel abutting the windshield and a bottom panel abutting the dash in the inflated position.

7. The assembly of claim 6, wherein the top panel and the bottom panel meet at a point of the airbag that is distal-most from the head restraint in the inflated position.

8. The assembly of claim 6, wherein the airbag includes a vent in the top panel.

9. The assembly of claim 2, wherein the lobes are above the seatback in the inflated position.

10. The assembly of claim 2, wherein the airbag includes a tether between the upper portion and the lower portion.

11. The assembly of claim 1, wherein the lobes are above the seatback in the inflated position.

12. The assembly of claim 7, wherein the bottom panel of the upper portion of the airbag extends upwardly from the lower portion of the airbag to the top panel of the upper portion of the airbag in the inflated position, the bottom panel of the upper portion extending upwardly from the lower portion of the airbag at an angle relative to the lower portion.

13. A seat comprising:
a seatback;
a head restraint extending upwardly from the seatback; and
an airbag supported by the seatback and inflatable from the seatback in a seat-rearward direction to an inflated position;
the airbag in the inflated position having a lower portion supported by the seatback and an upper portion supported by the lower portion, the upper portion extending from the lower portion upwardly to behind the head restraint; and
the airbag including a pair of lobes connected to the upper portion seat-rearward of the head restraint in the inflated position, the lobes extending from the upper portion along the head restraint in a seat-forward direction in the inflated position, the head restraint being between the lobes in the inflated position.

14. The seat of claim 13, wherein the lower portion has a first thickness from the seatback in the seat-rearward direction and the upper portion having a second thickness from the seatback in the seat-rearward direction, the second thickness being greater than the first thickness.

15. The seat of claim 14, further comprising an inflator in direct fluid communication with the lower portion, the upper portion being in fluid communication with the inflator through the lower portion.

16. The seat of claim 14, wherein the upper portion including a top panel and a bottom panel that meet at a point of the airbag that is distal-most from the head restraint in the inflated position.

17. The seat of claim 16, wherein the airbag includes a vent in the top panel.

18. The seat of claim 14, wherein the airbag includes a tether between the upper portion and the lower portion.

19. The seat of claim 13, wherein the lobes are above the seatback in the inflated position.

20. The assembly of claim 16, wherein the bottom panel of the upper portion of the airbag extends upwardly from the lower portion of the airbag to the top panel of the upper portion of the airbag in the inflated position, the bottom panel of the upper portion extending upwardly from the lower portion of the airbag at an angle relative to the lower portion.

* * * * *